US009697190B2

United States Patent
Baldwin et al.

(10) Patent No.: US 9,697,190 B2
(45) Date of Patent: *Jul. 4, 2017

(54) INTEGRATING IMAGE RENDITIONS AND PAGE LAYOUT

(71) Applicant: International Business Machines Corporation, Armonk, NY (US)

(72) Inventors: Nicholas A. Baldwin, Gladesville (AU); Mark C. Hampton, Fitzroy North (AU); Stefan A. Hepper, Morgan Hill, CA (US); Eric Martinez de Morentin, Manly (AU)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/688,324

(22) Filed: Apr. 16, 2015

(65) Prior Publication Data

US 2016/0048483 A1 Feb. 18, 2016

Related U.S. Application Data

(63) Continuation of application No. 14/459,427, filed on Aug. 14, 2014.

(51) Int. Cl.
*G06F 17/00* (2006.01)
*G06F 17/22* (2006.01)
(Continued)

(52) U.S. Cl.
CPC ........ *G06F 17/227* (2013.01); *G06F 3/04842* (2013.01); *G06F 3/04847* (2013.01); *G06F 17/212* (2013.01); *G06F 17/2247* (2013.01); *G06F 17/248* (2013.01); *G06F 17/30896* (2013.01); *G06F 17/30905* (2013.01)

(58) Field of Classification Search
CPC ..... G06F 17/211; G06F 17/212; G06F 17/248
See application file for complete search history.

(56) References Cited

U.S. PATENT DOCUMENTS

| | | | |
|---|---|---|---|
| 6,362,895 B1 * | 3/2002 | Laverty ................. | G06Q 10/10 358/1.13 |
| 6,694,487 B1 * | 2/2004 | Ilsar ...................... | G06F 17/212 715/247 |

(Continued)

OTHER PUBLICATIONS

U.S. Appl. No. 14/688,324, filed Apr. 16, 2015.

(Continued)

*Primary Examiner* — Laurie Ries
(74) *Attorney, Agent, or Firm* — Nicholas D. Bowman (57) ABSTRACT

A system and method involves creating, based upon a set of image rendition parameters, a set of image renditions for an image. A set of previews are selected to display. Each preview includes a markup language file and breakpoints that specify how a particular image rendition from the set of image renditions is displayed. A rendered instance is created for the previews and based upon the particular image rendition and page content. The rendered instances are displayed as part of a user interface. Instructions are received from the user interface. The instructions specify modifications to a particular preview of the set of previews. The markup file is modified based upon the instructions.

8 Claims, 7 Drawing Sheets

(51) Int. Cl.
*G06F 17/21* (2006.01)
*G06F 17/24* (2006.01)
*G06F 3/0484* (2013.01)
*G06F 17/30* (2006.01)

(56) References Cited

U.S. PATENT DOCUMENTS

| | | | | |
|---|---|---|---|---|
| 6,965,770 B2* | 11/2005 | Walsh | ............... | G06F 17/30053 348/E7.061 |
| 7,757,167 B2* | 7/2010 | Kobashi | ............... | G06F 17/211 715/243 |
| 7,814,425 B1* | 10/2010 | O'Shaugnessy | ..... | G06Q 10/107 715/752 |
| 7,865,573 B2* | 1/2011 | Tyhurst | ............... | H04L 67/025 709/202 |
| 7,917,848 B2* | 3/2011 | Harmon | ............... | G06F 17/212 358/1.1 |
| 8,508,587 B2* | 8/2013 | Kang | ............... | G02B 21/365 348/36 |
| 9,111,396 B2* | 8/2015 | Xie | ............... | G06F 17/217 |
| 2002/0054301 A1* | 5/2002 | Iwai | ............... | G06K 15/02 358/1.2 |
| 2002/0057281 A1* | 5/2002 | Moroo | ............... | G09G 5/363 345/668 |
| 2005/0094206 A1* | 5/2005 | Tonisson | ............... | G06F 17/248 358/1.18 |
| 2005/0172221 A1* | 8/2005 | Kobashi | ............... | G06F 17/212 715/246 |
| 2006/0193008 A1* | 8/2006 | Osaka | ............... | G06F 17/211 358/1.18 |
| 2008/0151294 A1* | 6/2008 | Natori | ............... | G06F 17/211 358/1.15 |
| 2011/0029854 A1* | 2/2011 | Nashi | ............... | G06F 17/3089 715/229 |
| 2011/0106782 A1* | 5/2011 | Ke | ............... | G06F 17/30256 707/706 |
| 2011/0157555 A1* | 6/2011 | Mashitani | ............... | G02B 27/2214 353/7 |
| 2011/0173188 A1* | 7/2011 | Walsh | ............... | G06F 17/30905 707/722 |
| 2011/0267500 A1* | 11/2011 | Maki | ............... | H04N 5/23209 348/231.99 |
| 2012/0203861 A1* | 8/2012 | Flack | ............... | G06Q 10/10 709/217 |
| 2013/0219024 A1 | 8/2013 | Flack | | |
| 2013/0227078 A1* | 8/2013 | Wei | ............... | H04L 67/02 709/219 |
| 2014/0019835 A1* | 1/2014 | Kakiuchi | ............... | G06F 17/30244 715/202 |
| 2014/0189502 A1* | 7/2014 | Enns | ............... | G06T 3/4038 715/247 |
| 2015/0186132 A1* | 7/2015 | Oliveri | ............... | G06F 8/34 717/120 |
| 2015/0220499 A1* | 8/2015 | Katic | ............... | G06F 17/30899 715/207 |

OTHER PUBLICATIONS

U.S. Appl. No. 14/459,427, filed Aug. 14, 2014.
Gallagher, N., "Responsive images using CSS3," May 19, 2011, 5 pages, Copyright © 2013 Nicolas Gallagher http://nicolasgallagher.com/responsive-images-using-css3/.
Grigsby, J., "A framework for discussing responsive images solutions," Cloud Four Blog Technical Notes, War Stories, and Anecdotes, May 3, 2012, 9 pages, Copyright © 2011 Cloud Four http://blog.cloudfourcom/a-framework-for-discussing-responsive-images-solutions/.
Mastykarz, W., "Responsive Image Renditions with SharePoint 2013," Jan. 24, 2013, 11 pages, Copyright © 2007-2013 Waldek Mastykarz. http://blog.mastykarz.nl/responsive-image-renditions-sharepoint-2013/.
Nandorf, J., "Responsive Web Design," Evaluation of Techniques to Optimize Load Time, UMEA University, Bachelor Thesis, Spring 2013, 17 pages.
Thomas, S., "Simple Responsive Images With CSS Background Images," Smashing Magazine, Jul. 22, 2013, 15 pages, http://mobile.smashingmagazine.com/2013/07/22/simple-responsive-images-with-css-backgrounds/.
Vasile, C., "How to Choose a Responsive Images Tool," Aug. 16, 2012, 11 pages, Copyright© 2013 Designmodo. http://designmodo.com/responsive-images-tool/.
Baldwin et al., "Integrating Image Renditions and Page Layout," U.S. Appl. No. 14/459,427, filed Aug. 14, 2014.
List of IBM Patents or Patent Applications Treated as Related.

* cited by examiner

INTEGRATING IMAGE RENDITIONS AND PAGE LAYOUT

BACKGROUND

The present disclosure relates to web page authoring. More specifically, the present disclosure relates to a method of generating virtualized previews of a web page using rules to apply different page layouts and style sheet instructions to assist web page authors to identify situations or device classes that may need additional direction in creating aesthetic page layouts.

When an author creates content and files that can be used to create a web page, the formatting of the page content, including image size and text layout, may present the content/web page clearly or in a harmonious manner on some devices, but not on others. Further, the format and layout of the page content defined by markup languages, e.g., hypertext markup language (HTML) or Extensible Markup Language (XML), and style sheet files, e.g., cascading style sheet (CSS) files or extensible style sheet language transformations (XLST) files, may present the page content differently for various devices for example on large-screen and small-screen devices. Identifying page formats and device types for all the different devices may be difficult for web page authors.

SUMMARY

Embodiments are directed toward a method that involves: creating, based upon a set of image rendition parameters, a set of image renditions for an image; selecting a set of previews to display, each preview in the set of previews including upon a markup language file and breakpoints (e.g., from a style sheet file) that specify how a particular image rendition from the set of image renditions is displayed; creating a rendered instance for each preview in the set of previews based upon the particular image rendition and page content identified by a corresponding preview; displaying the rendered instances as part of a user interface that includes preview editing tools; receiving instructions from the preview editing tools that specify modifications to a particular preview of the set of previews; and modifying the markup language (and/or style sheet) file based upon the instructions.

Certain embodiments are directed toward a system that includes one or more computer processor circuits that are configured to: create, based upon a set of image rendition parameters, a set of image renditions for an image; select a set of previews to display, each preview in the set of previews including upon a markup language file and breakpoints (e.g., from a style sheet file) that specify how a particular image rendition from the set of image renditions is displayed; create a rendered instance for each preview in the set of previews based upon the particular image rendition and page content identified by a corresponding preview; display the rendered instances as part of a user interface that includes preview editing tools; receive instructions from the preview editing tools that specify modifications to a particular preview of the set of previews; and modify the markup language file based upon the instructions.

Various embodiments are directed to a computer program product for authoring web pages. The computer program product includes a computer readable storage medium having stored thereon: program instructions executable by a computing device to cause the computing device to: create, based upon a set of image rendition parameters, a set of image renditions for an image; select a set of previews to display, each preview in the set of previews including upon a markup language file and breakpoints (e.g., from the style sheet file) that specify how a particular image rendition from the set of image renditions is displayed; create a rendered instance for each preview in the set of previews based upon the particular image rendition and page content identified by a corresponding preview; display the rendered instances as part of a user interface that includes preview editing tools; receive instructions from the preview editing tools that specify modifications to a particular preview of the set of previews; and modify the markup language (and/or the style sheet) file based upon the instructions.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to web page authoring, and more particular aspects relate to the review and creation of image renditions associated with cascading style sheet files that can accompany markup language files that define how a web page is rendered. While the present disclosure is not necessarily limited to such applications, various aspects of the disclosure may be appreciated through a discussion of various examples using this context.

Embodiments of the present disclosure provide a webpage author with a set of visual representations for how a given webpage will be presented to eventual users of the webpage. These representations can relate to different display capabilities of devices that may be used by the users to render and display the webpage. The set of visual representations can be defined by rules, which can include the type of page being created, a set of breakpoints, viewing device capabilities, and combinations thereof. For instance, analytical data about the expected audiences may be used to specify what devices should be supported and/or associated breakpoints. Embodiments of the present disclosure include a mechanism to validate the set of visual representations or set of previews and to facilitate correction in the case of identified problems.

Embodiments relate to aesthetics relative to the breadth of computing devices that may display a web page consisting of at least one markup language (e.g., HTML or XML) file and one style sheet file (e.g., CSS or XLST). For ease of discussion, the disclosure makes references to particular types of markup languages (e.g., HTML) and style sheets (e.g., CSS); however, it is understood that other types of markup languages and style sheets can also be used. Moreover, there could be various other files, which can include, but are not limited to, multiple CSS files, JavaScript files, and resources files (such as media/images) that may be included as part of a web page. A web page may display quite differently on large versus small displays and across devices with low and high resolution displays. Page content located in an HTML file, or other markup file, can be used with a cascading style sheet (CSS) file, or other style sheet, that can describe the formatting and layout of a webpage to provide and to adjust the web page content in its final rendered form. Both a HTML and a CSS file may include instructions that specify fonts (including color, size, and placement on the web page) as well as the display properties of images and other web page elements specified by the HTML file.

Consistent with embodiments, a computer implemented system can assist an author in the creation of a webpage intended to be displayed on a wide variety of computing device displays. For instance, the system can help the author ensure that the cascading style sheet file or HTML file includes page layout instructions for each possible display type. The system can be configured to identify, such as when an author makes adjustments to a webpage layout that applies different instructions from a CSS file, any problems, such as gaps between break points and other issues or discrepancies. These problems might otherwise be overlooked when the author creates the web page and submits it for eventual publication on the Internet. In particular embodiments a system can be configured for pre-selecting webpage layouts and identifying ranges of breakpoints for which there is no appropriate rendition of the web page elements or page rendering instructions in the CSS file. This can assist webpage authors by avoiding time-consuming manual corrections to web pages, images or CSS files and can reduce the frequency with which webpages are displayed incorrectly on various devices.

Various embodiments are directed toward the use of responsive design for webpages. Responsive designs can use media queries and/or use device detection services to trigger change in presentation based on capabilities/attributes. They can also have a fluid layout, with containers that dynamically scale to available dimensions, and fluid content, with images are explicitly set to scale to their parent container. Using responsive design, a website can deliver different representations of an image based on the device's capabilities, including the device's viewport. For instance, a different sized image may be generated for each of a desktop browser, tablet and phone. Using a content management system (CMS), the author of the website could provide an image which is automatically transformed into multiple scaled versions of the image e.g., small file, medium file, large file, for use on different devices. Various embodiments of the present disclosure relate to a system that allows for multiple variations of such an image to be displayed within the context of the different usages. Moreover, the system can facilitate creation of the different image versions (or "image renditions"). This can be particularly useful for situations where the authors may not have the design abilities, necessary tools or permissions inside the CMS to adequately create the different image renditions.

Consistent with embodiments, images within websites can be displayed differently based on other approaches too. For instance, responsive websites may scale, clip (partially hide), switch/replace and even use combinations of these approaches (ignoring removing/hiding as it is irrelevant for this discussion). Each approach has ramifications. Simply scaling an image down may cause problems due to the file size of the image (and thus encounter bandwidth/performance limitations); clipping may not provide an adequate control and the focus of the image may be obscured or context lost; switching uses server-side techniques that rely upon having image already created or the use of dynamic creation.

Embodiments of the present disclosure are directed toward a system that is configured to provide an author with a user interface that allows for control (for art direction) of when to scale, clip and/or replace images (with design system defaults and permissions). The user interface can present different renderings of a webpage while providing a mechanism for direct and immediate feedback of the different renderings (e.g., preview editing tools that allow for direct editing of the preview). This can be particularly useful for identifying issues with an image due to how it is to be used at various layouts/resolutions. Moreover, the amount of effort for author can be low (e.g., no image processing or manual uploading of files) because much of the work can be automated.

As discussed herein, embodiments relate to a system that allows the author to select an initial image(s) (either via upload or an existing image in library). The selection by the author drives a process which informs the system how to use the image and any variations and help the author preview the results. The system itself can determine the necessary steps to achieve this including creating variations, using alternatives and generating previews and alternatives if needed. It may also result in additional design/presentation system artefacts being used/created.

Various embodiments are directed toward a system that is designed to work with existing CMS and Digital asset management systems and to tie in with workflows and the design system to provide a view of how the content (and specifically the images) will be displayed on different devices.

Figure 1:
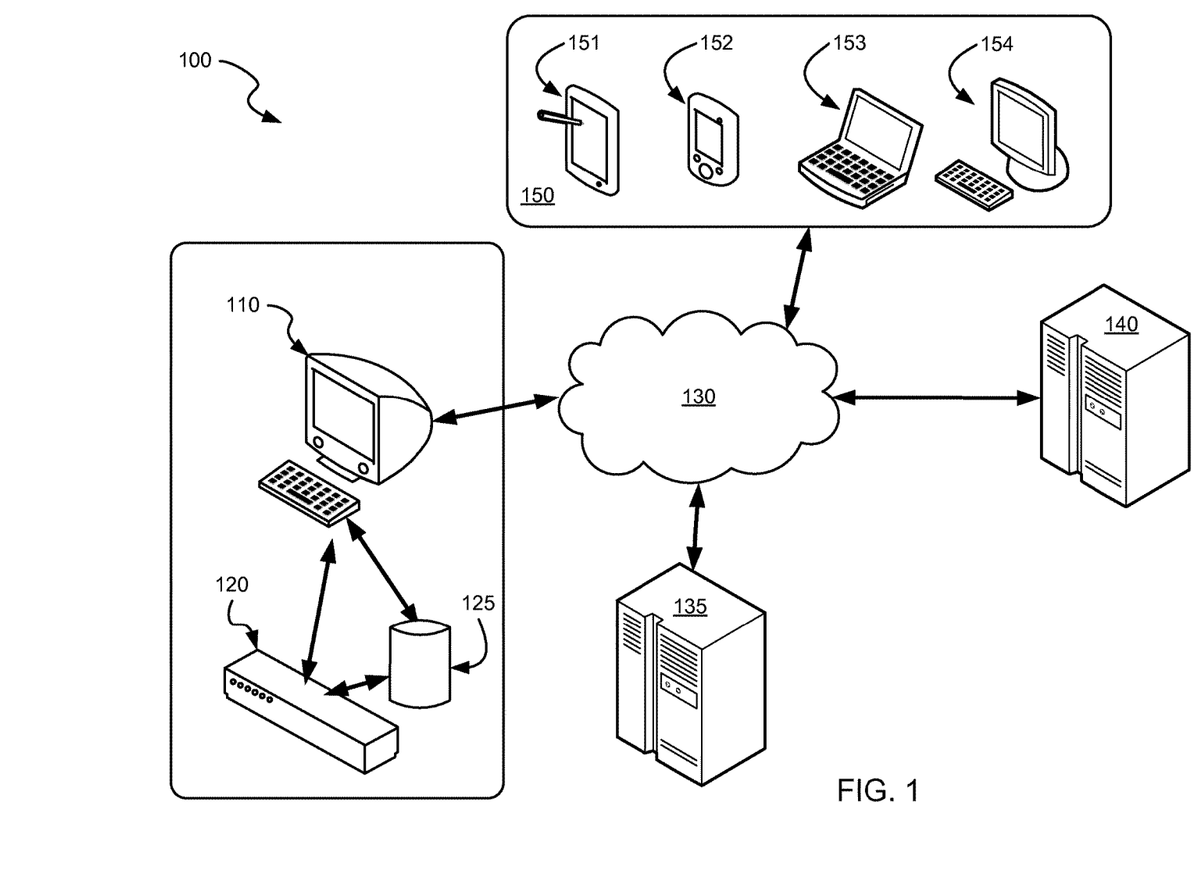
FIG. 1 depicts a system of creating and using cascading style sheets associated with markup language files and delivered (as part of web pages) to computing devices, according to embodiments of the present disclosure.

FIG. 1 provides an overview of a system 100 for creating and applying instructions from HTML and CSS files to the web pages created using systems similar to those mentioned herein. An authoring computing device 110 may be connected to and a digital asset management system 120 and a storage medium 125. The authoring computing device 110 may request images and page content from the digital asset management system 120, the storage medium 125, or a remote storage device 135 and use them to create, according to preselected and author-selected page previews, rendered instances of web pages that show the final page layout.

Authoring computing device 110 may include a general purpose processor or computer processor circuits that may perform data requests, receive data, and alter data. The authoring computing device 110 may also include a dedicated graphics processor or graphics processor circuits that are configured to render and display images based on data received by the system, including images, graphical representations of text, and other graphical features that may be included in a web page. Some computer processor circuits may contain both circuit elements configured for general purpose calculation and data handling as well as graphics processor circuits. Computer processor circuits and graphics processor circuits may also receive and respond to inputs indicating changes to elements displayed on a computing device display. An author may use the authoring computing device in order to select multiple system-provided webpage previews (which may be called simply "previews") for a variety of breakpoint limits, each breakpoint limit corresponding to a display size or type that may receive a tailored set of rendering instructions in the web page cascading style sheet.

Breakpoints, or breakpoint limits, within the CSS can determine when different rule sets should be applied for different modes of presenting the webpage as it is rendered on a computing device. A preview may generally have two breakpoints associated with it, where a lower breakpoint value indicates a minimum threshold (display width, display height, etc. . . . ) for using some preview layout rules associated with the preview, and an upper breakpoint value indicates a maximum threshold for which the same preview layout rules can be used to help create a cascading style sheet file, HTML file, or other file that can regulate the display of the web page on a device display.

The authoring computing device 100 may present an author with multiple system-selected previews (or "page previews"). A preview may include descriptive elements of a web page layout for a give set of breakpoints or breakpoint limits, such as the location of images, the size and position of a page title, the location of page body text, and the positions of other significant page elements, such as comment boxes, navigation bars, and further image elements. After an author reviews the suggested initial preview and selects which ones to render for inspection, the system may then create a corresponding rendered instance of each selected preview, where the displayed rendered instance approximates the actual webpage that a user will see on her computing device. The author may choose to modify the preview upon viewing the rendered instance, after which the system may alter the corresponding preview and render and display it for author approval. An author may then use the authoring computing device 110 to create a new image rendition which may be saved on the authoring computing device 110 or may be saved on the digital asset management system 120 or may further be saved by transmitting file over a network 130 onto a remote storage device 135.

Consistent with embodiments, image renditions can define the dimensions that are used to display images, such as dimensions for displaying differently sized versions of a source image for different devices. For example, an image rendition can specify the width and/or height for all images that use that image rendition. The image renditions can be created for every image that is uploaded to an image repository. For example, designers can create a first image rendition for tablets and a second image rendition for desktops. The image rendition can also be specified for different uses within a page (e.g., for use as a banner or for use as a thumbnail).

Hypertext markup language (HTML) files and the cascading style sheet (CSS) files may be stored together on a server 140 connected to the network 130. When users with computing devices 150, such as a tablet computer 151, a digital telephone 152, a laptop computer 153, or a desktop computer 154, request a webpage from the server 140, the server 140 may provide the corresponding HTML file and cascading style sheet file to the requesting computing device so that the computing device can render the files and display a webpage to the user.

According to various embodiments, the authoring computing device 100 can be configured to provide an authoring process that includes a user interface that can display previews that rely upon a responsive image object which supports multiple renditions and image sources. Digital asset management system 120 can be configured to transform images into image renditions. A preview model can specify displays/breakpoints and facilitate their management. This preview module can also provide for dynamic layouts to be used. The system can be configure to matches a layout and breakpoint(s) to the most appropriate image rendition. The system can use an extension to the image object to record what action to take on renditions between breakpoints based upon input from the author and using a user interface. For instance, the user interface can include preview modification/editing tools (such as in-browser editing tools) for cropping, resizing or replacing the image rendition. The system can also apply a set of rules which govern what actions users may take.

For instance, an author can insert or select an image for use with a webpage. The system can allow the author to see more information about how that image will be presented using the system default settings for image renditions e.g. small, medium, large renditions for different displays. The author can be provided access each rendition and be allowed to adjust the image individually as desired. The author can also be presented with a visual rendering of how the renditions will be displayed relative to the various breakpoints/displays that are supported.

While there may be many breakpoints used in a responsive design, the system can support a subset of more important breakpoints, e.g., breakpoints associated with targeted at the primary devices used by the key audience segments. These breakpoints can be predetermined (e.g., set manually by designers or calculated by the system based on analytics and detection of user agents/capabilities). These pre-determined breakpoints can then be used to identify an initial set of displays to be reviewed by the author.

Consistent with embodiments, the system then can provide a user interface that includes a comparative (side-by-side, or serial) display based upon a rendering for each such initial preview. The user interface can include options for the author to either accept the system defaults (both display and treatment type) or override/augment (with ability to enforce approval/workflow) for each rendered instance of a preview. This may include actions such as clipping/cropping the image rendition, scaling it or replacing it. The author can also flag the image as problematic so that a designer/skilled user can treat the problem.

Based on the selections made by the author for the primary displays/breakpoints, the system can then identify additional displays/breakpoints for previewing before final acceptance. The system can be configured to use the prior author inputs from the initial displays to 'fill in' what to do between these breakpoints, and help identify in-between steps that may need further attention.

Figure 2:
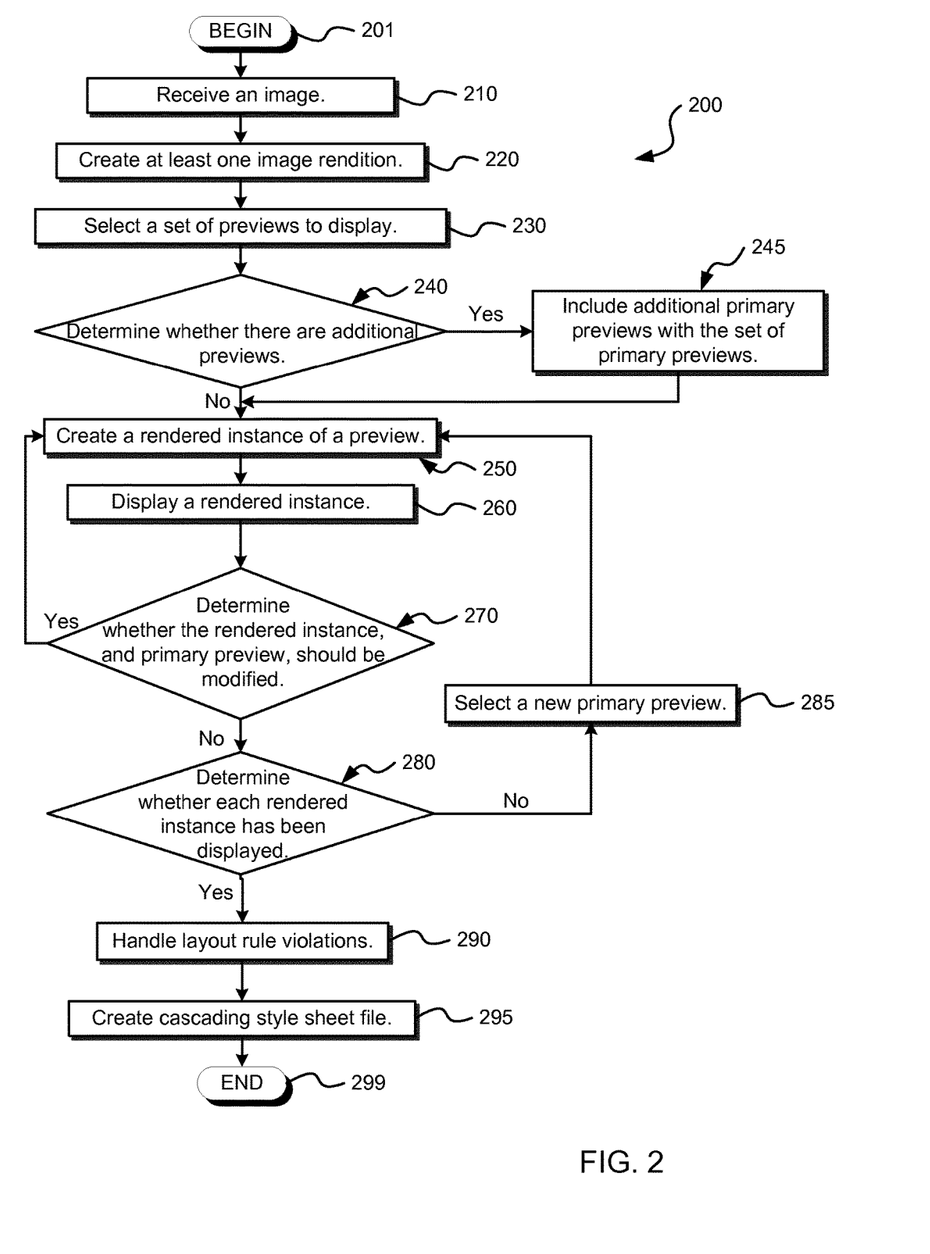
FIG. 2 shows a method of creating a cascading style sheet file that reflects page layout decisions for at least one page preview selected and approved during the page authoring process, according to embodiments of the present disclosure.

FIG. 2 describes a method 200 of creating a web page configured to render page content on a variety of computing device displays. The method begins in block 201. The authoring system may first receive an image, as indicated in block 210. This image may be manually uploaded by an author to the authoring system, or it may be selected from a remote computer server, or provided by a digital asset management system to which the author has access. Next, the authoring system may create an image rendition, as indicated in block 220. The image rendition may be created according to image rendition parameters that may be already entered into the authoring system or which may be manually selected by the author. The image rendition may have different crop borders that may correspond to the minimum and maximum sizes of the image that may be used on webpages rendered on devices between the lower and upper breakpoint limits for a particular web page rendition.

The authoring system may then choose a set of preview models (or simply "previews") to present to the author, where each preview includes the information (such as the page layout) that can be used to render the webpage, as indicated in block 230. Thus, each preview can include an HTML file and CSS file as well as the desired display size and related parameters. In this manner, each preview can correspond to a set of data that can be provided to a device and corresponding web browser, for subsequent rendering on a display screen.

For example, when creating a web page intended to cover devices such as digital telephones, tablet computers, laptop computers, and desktop computers, the authoring system can select a preview for each device type. This selection can be based upon a predetermined set of commonly used devices. However, an author may request or indicate that the authoring system provide additional previews to accommodate other displays or devices such as higher resolution computing device displays with larger visible areas for portraying webpages to a user, as described in block 240. When the system is so instructed, it may include the indicated as additional previews with the first set of initial previews already displayed to the user, as indicated in block 245.

If no additional previews are indicated, or after including additional previews (as indicated in block 245), the system may then proceed to create a rendered instance of one or more previews, as indicated in block 250. The rendered instance may be displayed for the author as part of a user interface as indicated in block 260. At this point, and author may begin to make modifications to a preview corresponding to the rendered instance. This may include altering its overall appearance, including, for example, adjusting the position of images within the rendered instance, adjusting the position of text elements such as the page title or section headers, or adjusting the appearance of text elements by altering the fonts, font sizes, font colors, or numbers of columns of body text within the rendered instance. In various embodiments, the system can be configured to render multiple previews at this time. This can allow for the author to view and compare multiple rendered instances, whether they are viewed side by side or sequentially displayed. For ease of discussion, the method 200 refers to a single rendered instance being displayed and modified at a time.

Consistent with embodiments, the system may determine whether the preview (and corresponding subsequently rendered instance) should be modified based upon inputs from an author. For instance, system can provide an interface that allows the author to specify various modifications to the preview. The modifications can be used to generate instructions specifying how to modify the preview in a particular manner, as indicated in block 270. When a preview has been modified, the system can also modify the layout rules associated with that particular preview before creating another rendered instance, as indicated in block 250, and display that rendered instance, as indicated in block 260, to the user for approval.

When an author's review of a rendered instance does not result in a desired modification, the authoring system may then determine whether each rendered instance based upon a preview in the set of previews has been displayed, as indicated in block 280. If there are additional rendered instances, or additional previews in the set of previews, that need to be reviewed by an author, the system may then select a new preview, as indicated in block 285 and proceed to create a rendered instance on the newly selected preview, according to block 250. However, if each preview and corresponding rendered instance has been displayed to the author, the system may then proceed to handle layout rules violations as shown in block 290. As discussed herein, the handling of rules violations may include adjusting break points and potentially creating new previews for any break point gaps created by the adjustment. After handling layout rules violations, the system may update the HTML markup as indicated in block 295 to apply the appropriate instructions from the CSS file. The method ends in block 299.

According to a specific example for creating a webpage for a responsive design, an author could select image that is a 600px (600 pixels) image. The system allows the author to see (if desired) the set of renditions (if already determined from the system) within the layout/breakpoints to be used (e.g. image equivalent of this) and/or choose from common breakpoints to see which rendition is to be used. System then renders the preview based on a set of initial breakpoints—in this example they initial breakpoints include "Desktop", "Tablet Landscape" "Tablet Portrait", "Mini Tablet" and "Phone". The author can view and compare the rendered instance of the previews in a side by side view provided by a user interface. This allows the author to see how the selected image will be displayed (by default). The author can then chose to modify the preview(s). The modifications may be the result of scaling issues related to the selected image.

For example, at a first break point for a large width of 1400px, the image may be displayed at full size: 600px width with no adjustment. Thus, the author may accept the corresponding preview. At the next breakpoint of 940px, the image may be scaled down to 400px width. The author may accept this preview as well. A corresponding image rendition can be used, in which the image is scaled into a smaller file. At the next breakpoint of 560px, the author may determine that image appears slightly too small because it is being displayed at 280px. The author may therefore decide to modify the preview. This may include clipping (at smaller sizes rather than scaling) using an inline display editing tool. The author may also control the offset margins to place the clipped area as desired. A smaller image rendition can then created and CSS style info is noted for display of the corresponding rendition within this layout/breakpoint.

At the next breakpoint, 430px, the author may decide that the image is now getting too small at 230px (could be because of clipping or size) and the author may decide to crop the image using the (inline) display modification tool. A separate image rendition can then be created and stored (as the 'small' rendition). At the next breakpoint: 300px, the image might actually show at a larger size: 300px because of the use of a single column display. However, it may make sense to use the cropped area from the prior preview. The author can also sets image to scale down for device displays that are below the 300px size.

The system or author may then identify an additional preview at one (or more) breakpoints due to the scaling and clipping by the author. This might occur near a breakpoint between 940 and 560. For example, the author may feel that the display looks ok at 780px, however, the author may see signs of problems that would crop up in smaller sizes. Accordingly the author can select an inter-intermediate size of 640px as an additional preview. The system can render an instance of this additional preview. If the author sees problems with the rendered instance, the author can address the problems, e.g., by starting clipping earlier, adding breakpoints, or specifying other modifications.

The system can then create the renditions and adjust any presentation rules; however the author may still request that rendered instances be provided for intermediate sizes relative to the breakpoints mentioned above. For example, the author may request rendered instances be provided for commonly used devices and their corresponding display sizes.

Figure 3:
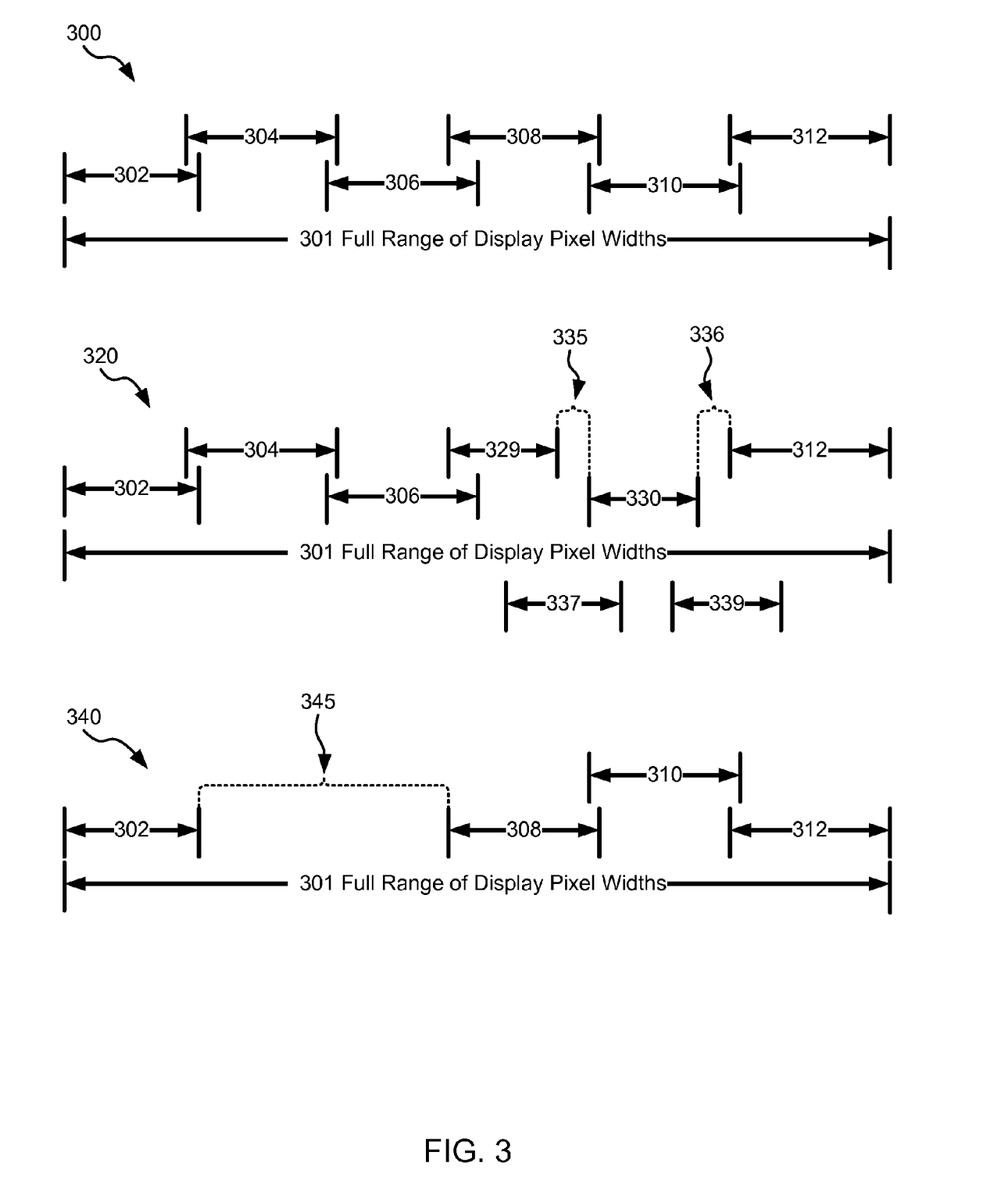
FIG. 3 shows a conceptual map that includes some gaps in ranges of breakpoints associated with page previews described by a cascading style sheet file, according to embodiments of the invention.

FIG. 3 shows distributions of breakpoint limits associated with previews of a web page, according to embodiments. The distribution of breakpoints include first distribution of preview breakpoint limits 300, a second distribution of preview breakpoint limits 320, and a third distribution of preview breakpoint limits 340. The first distribution of preview breakpoint limits 300 may have a full range of breakpoint limits 301 and several smaller ranges of breakpoint limits, each of which may corresponds to a preview presented by a webpage authoring system to a webpage author during the process of preparing a web page for publication. The first distribution of preview breakpoint limits 300 may contain a first range 302, a second range 304, a third range 306, a fourth range 308, a fifth range 310, and a sixth range 312. The first range may extend to one limit of the full range of breakpoint limits and overlap with the second range 304. The second range 304 may further overlap with the third range 306. The third range 306 may overlap with both the second range 304 and the fourth range 308. The fifth range 310 may overlap with the fourth range 308 and the sixth range 312. The sixth range may end at the other limits of the full range of breakpoint limits.

Alternative distributions of ranges of breakpoint limits may not overlap with each other but may terminate at adjacent values within the full range of breakpoint limits 301. For example, a first range 302 and a second range 304 that overlap may have an overlapping range where a device could use either a preview associated with the first range 302 or the second range 304 and may have further rules to determine which page that rules in a cascading style sheet file to use. However, if a first range 302 and the second range 304 abut each other, then there may not only be no overlapping breakpoint values described by each of the ranges but there may be no gap in breakpoint values between the first range 302 and the second range 304.

A second distribution of preview breakpoint limits 320 may reflect modifications in the page preview breakpoints associated with individual page previews after an author uses the user interface to specify a modification of a preview and after the authoring system handles potential layout rule violations by modifying the breakpoint limits associated with a preview as modified. For example, the second distribution of preview breakpoint limits 320 may reflect changes in the breakpoint limits associated with two previews and their corresponding rendered instances.

In response to the system identifying that a rendered instance as modified and having a corresponding preview has been modified such that it violates the preview layout rules, the system may adjust the breakpoints associated with the preview as modified so that it conforms to the preview layout rules. The first range 302, second range 304, the third range 306, and the sixth range 312 may be the same after the system handles layout rule violations as described in FIG. 2 and FIG. 7. However, the fourth range 308 and the fifth range 310 may have been adjusted to have narrower breakpoint limit ranges as reflected by a seventh range 329 and an eighth range 330. There may be a first gap 335 between the breakpoints associated with the seventh range and the eighth range and a second gap 336 between the breakpoints associated with the eighth range 330 and the sixth range 312. Adjusting the breakpoint limits associated with a preview and rendered instance may include both narrowing the breakpoint limits and expanding the breakpoint limits according to the authoring systems attempts to bring the rendered instance and page preview into compliance with the page layout rules built into the authoring system.

The authoring system may propose additional previews with corresponding breakpoint ranges 337 and 339 based upon detecting gaps between the breakpoint limits associated with previews, or layout rules, that are stored in a CSS file generated from the previews and rendered instances. The breakpoint ranges 337 and 339 associated with the additional previews may overlap with other ranges or may be sufficiently narrow to abut adjacent breakpoint ranges but not overlap them.

A third distribution of preview breakpoint limits 340 may be based on the first distribution of preview breakpoint limits and reflect an alteration made by an author selecting only some of the set of previews provided to the author by the authoring system to create a first set of rendered instances. The third distribution of preview breakpoint limits 340 may be created by an author selecting previews associated with the first range 302, the fourth range 308, a fifth range 310, and the sixth range 312 but not selecting previews associated with the second range 304 and the third range 306. By selecting only some of the initial set of previews, the author may have created a third gap 345 between the breakpoint limits associated with some of the previews. The authoring system may one or more additional previews to the webpage author to help the author avoid having gaps in the cascading style sheet file breakpoint distribution, giving the author a second opportunity to choose previews to create a more comprehensive CSS file.

Figure 4:
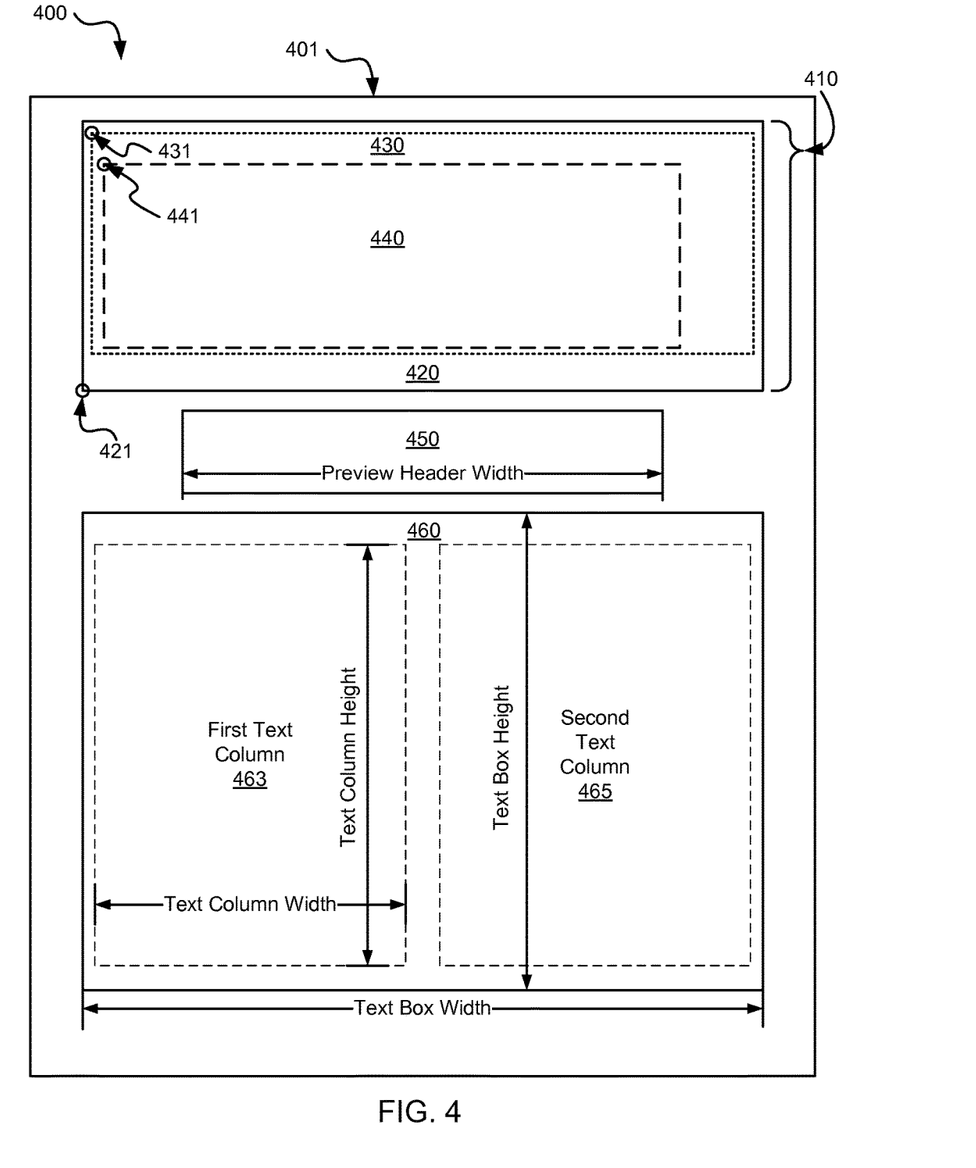
FIG. 4 shows a user interface displaying a rendered instance that includes a draft image rendition and text boxes for page content that may be included in an HTML file, according to aspects of the present disclosure.

FIG. 4 shows elements of a rendered instance 400 that can be displayed as part of a user interface that allows for the modification of the corresponding page preview. The rendered instance 400 may contain a page outline 401, an image rendition 410, a header 450, and a text box 460. The image rendition 410 may be based upon an image 420 and may contain an origin point 421 that describes the position of the image relative to the page outline 401, as well as a first reference point 431 associated with a first crop box 430 and a second reference point 441 associated with a second crop box 440.

The header 450 may have a preview header width that describes the width of text or other materials presented within the header 450 space. The text box 460 may include a first column of text 463 with a text column width and a text column height and may also include a second text column 465 with its own text column width and text column height. The text box 460 may have a text box with and a text box height associated with it to describe the overall area of text within the page outline 401.

Figure 5:
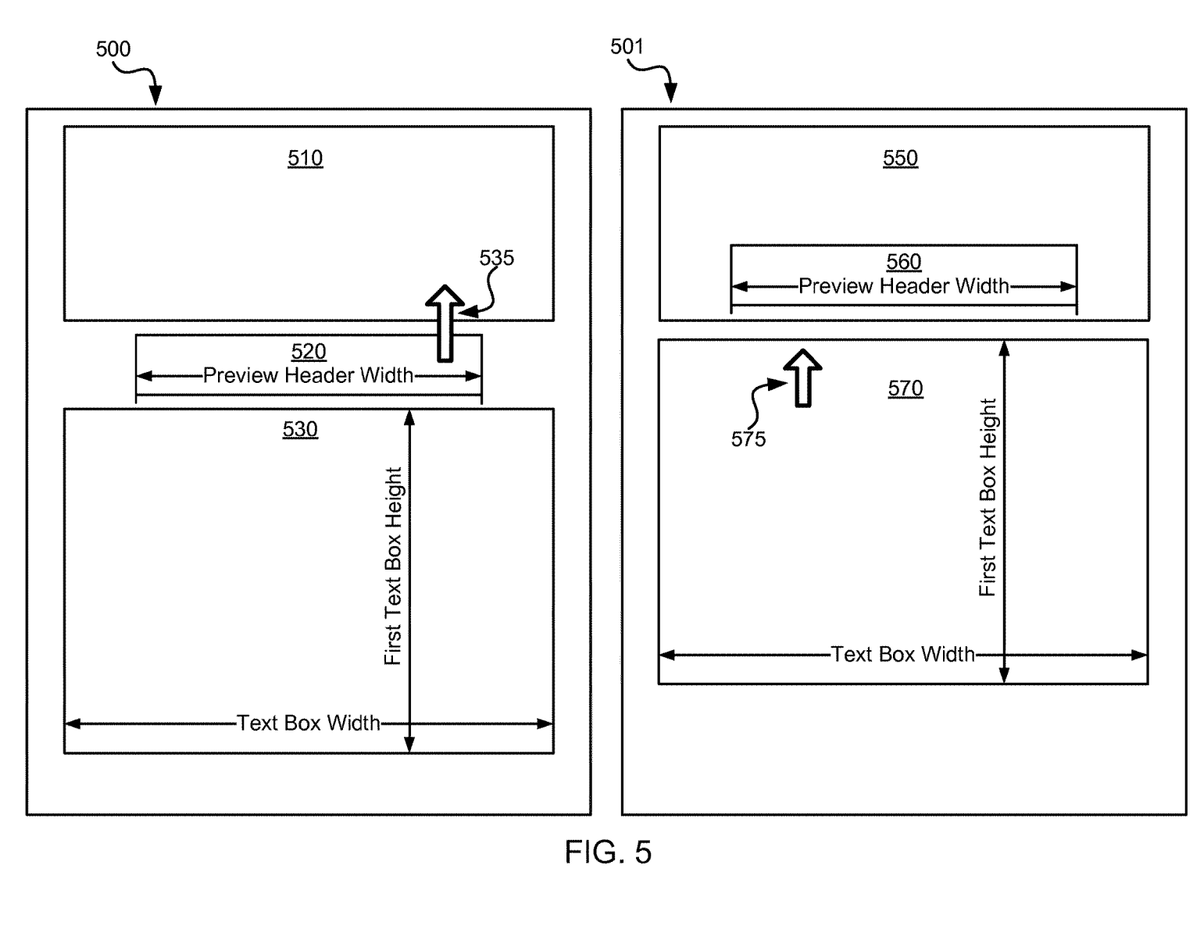
FIG. 5 shows a user interface displaying a rendered instance that reflects the layout of the preview before and after a modification, according to aspects of the present disclosure.

FIG. 5 shows a first rendered instance 500 and a second rendered instance 501 that may reflect the changes in a layout provided to the authoring system by an author. The figures shown here contain elements described in FIG. 4 to explain examples of changes that can be made to a preview. The rendered instance 500 contains an image rendition 510, a header 520, and a text box 530. Image rendition 510 is above the header 520 and the header 520 is above the text box 530. The text box has a text box with and a first text box height. An author may choose to move the header in a first direction 535 in order to superimpose the header 520 over image rendition 510 while leaving the boundaries of the text box 530 unchanged and making no modifications to the contents of the text box (e.g., increasing or decreasing font size, or changing the font).

A second rendered instance 501 shows a graphical representation of the elements of the corresponding webpage after moving the header 520 in the first direction 535. Image rendition 550 now has a header 560 superimposed upon it. Consequently, text box 570 retains the text box with the first text box height seen in text box 530 of the first image rendition 500. However, layout rules may specify the relationship between text box 530 and the header 520 (e.g., a minimum separation distance). Accordingly, text box 570 has also moved in the first direction as indicated by the arrow 575 to bring it closer to the image rendition 550 with the superimposed header 560. The alterations made to create second rendered instance 501 are associated with the vertical positioning of elements within second rendered instance 501 with no effect on the horizontal size of the page and no alteration to the widths of various elements in the second rendered instance 501. Whatever breakpoints for breakpoint limits maybe associated with the first preview are likely to remain the same for second preview. Thus, while alterations to the cascading style sheet file must reflect alterations made to second preview (by having made alterations to its corresponding rendered instance), there is less likelihood of layout rule violations that may cause the system to adjust breakpoints for breakpoint limits associated with second preview, as described in FIG. 2 and FIG. 3.

Figure 6:
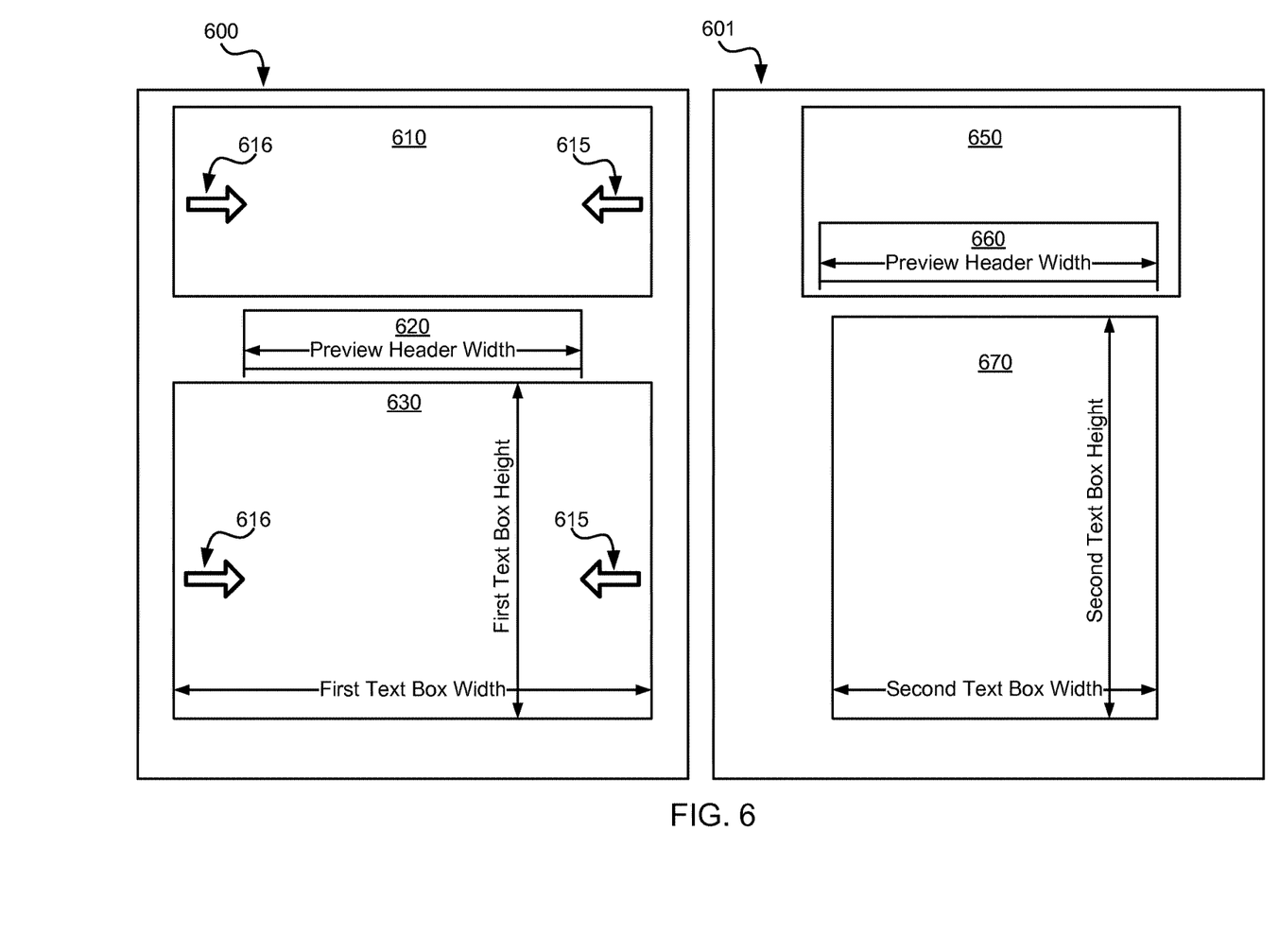
FIG. 6 shows a rendered instance before and after page layout changes that may result in the creation of an additional preview, according to aspects of the present disclosure.

FIG. 6 shows a first rendered instance 600 and a second rendered instance 601 that may reflect the changes in a layout provided to the authoring system by an author. First rendered instance 600 contains first image rendition 610, a first header 620, and a first text box 630. Second preview 601 contains a second image rendition 650, a second header 660, and a second text box 670. First image rendition 610 in the first text box 630 may be narrowed by moving the left side each inward toward the center of first rendered instance 600, in the first direction 616. Similarly, first image rendition 610 and first text box 630 may be further narrowed by moving their right sides inward toward the center of first rendered instance 600 in direction 615.

By decreasing the width of both the first image rendition 610 and the first text box 630, the overall effect is to narrow the entire rendered instance and to increase the margin surrounding the central core of page preview (and rendered instance) elements, as shown in second rendered instance 601. The width of second image rendition 650 and second text box 670 are both more similar to the width of the second header 660. By narrowing the second text box 670 (or, in alternative embodiments, by narrowing the width of the columns of text in second text box 670), the height of the second text box 670 has been increased to allow for all of the text to be displayed. Under some embodiments, such narrowing may be acceptable for the breakpoints associated with the page preview. Under other circumstances, however, the reduced width and increased margins may violate certain preview layout rules such as the fraction of text that may be empty or the minimum relative width of body text and image relative to the breakpoints associated with the page preview.

As described in FIG. 2 and FIG. 3, when handling layout rule violations, as may occur when the width of the widest element of a web page is too narrow for the breakpoints associated with that page layout, the authoring system may alter the preview by reducing the range of the breakpoint limits associated with the preview and rendered instance. When breakpoint limit narrowing occurs, the authoring system may subsequently offer an additional preview to a web page author for consideration as part of the HTML and CSS files for the web page.

Figure 7:
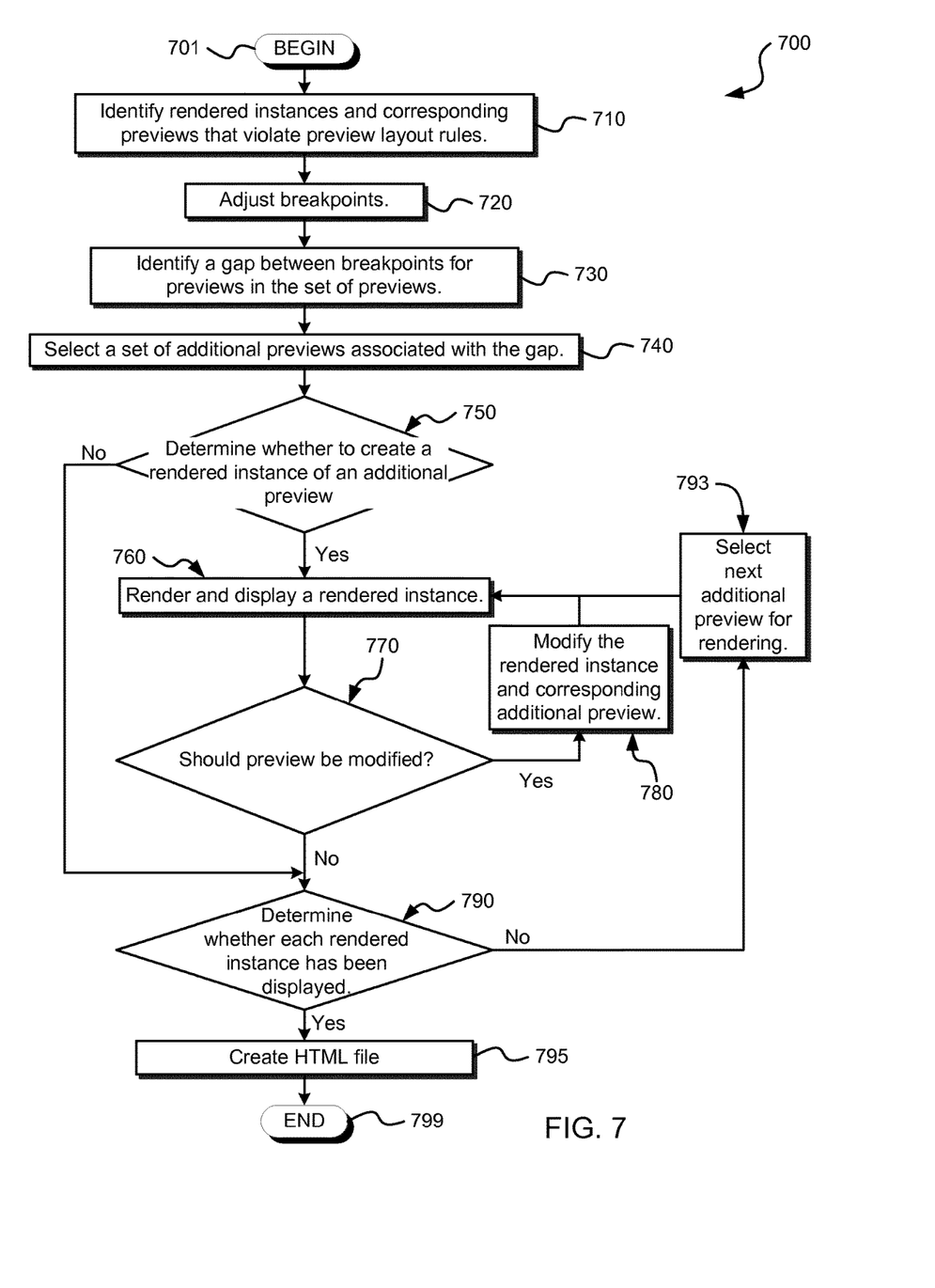
FIG. 7 shows a method of handling layout rule violations, according to aspects of the present disclosure.

FIG. 7 shows a method handling of layout rule violations 700, according to embodiments. The method begins in block 701. In order to handle a layout rule violations, one may first identify previews that violate the preview layout rules, as indicated in block 710. Next, as described in FIG. 6, the breakpoints may be adjusted in order to bring the preview into conformance with the preview layout rules after modifying the preview, as described in block 720. The system may then identify a gap between breakpoints associated with previews within the distribution of breakpoint limits, as described in block 730. After identifying gaps between breakpoint limits associated with the previews, the system may then select one or more additional previews and offer the set of additional previews to the author for consideration to fill the identified gaps between breakpoint limits, as described in block 740.

The authoring system may then determine whether to create a rendered instance of at least one additional preview as described in block 750. This step may be accomplished by receiving an input from the webpage author indicating that the authoring system should create a rendered instance for at least one additional preview in the set of additional previews. If the system has been instructed to create a rendered instance, it may then render and display a rendered instance to the user as described in block 760. The system may then determine whether the additional preview should be modified, as described in block 770. Upon determining that the corresponding additional preview should be modified, the system may modify the additional preview, as described in block 780. If the system determines that a rendered instance and corresponding additional preview are to be left unchanged, the system may then proceed to determining whether each rendered instance has been displayed (block 790).

If a system determines that some rendered instances have not been displayed, the system may proceed to select the next preview for rendering, as described in block 793, and then render the additional preview and display the rendered instance as described in block 760.

Finally, the system may modify or create an HTML file described in block 795, upon determining that each rendered instance has been displayed and accepted by the author. The method ends in block 799.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:

creating, for an image, a set of image renditions according to a set of image rendition parameters that correspond to image display capabilities of a predetermined set of electronic devices, the set of image rendition parameters including a set of cropping borders, a set of minimum image sizes, a set of maximum image sizes, a set of desired image display sizes selected, through the use of a set of image preview editing tools, from the set of image renditions, and a set of image display dimension breakpoints within a range of image display dimensions;

selecting a set of previews to display, each preview in the set of previews including a markup language file configured to render web pages and the set of image display dimension breakpoints that specifies a particular image rendition from the set of image renditions to display on an electronic display device from the predetermined set of electronic devices;

creating a rendered instance for each preview in the set of previews based upon the particular image rendition and page content identified by a corresponding preview;

displaying the rendered instances as part of a user interface;

receiving instructions from the user interface and that specify modifications to a particular preview of the set of previews; and modifying, based upon the instructions, the markup language file configured to render web pages and corresponding to the particular preview.

2. The method of claim 1, further comprising:

identifying violations of preview layout rules caused by the modifications to the markup language file configured to render web pages; and adjusting the set of image display dimension breakpoints associated with the particular preview based upon the identified violations.

3. The method of claim 2, further comprising:

identifying at least one gap between image display dimension breakpoints corresponding to displaying images associated with previews in the set of previews; and selecting a set of additional previews corresponding with the at least one gap between image display dimension breakpoints of the set of image display dimension breakpoints.

4. The method of claim 3, further comprising:

creating an additional rendered instance for an additional preview of the set of additional previews based upon the set of image renditions;

displaying the additional rendered instance as part of the user interface; and modifying, based upon input from the user interface, the markup language file and a cascading style sheet (CSS) file that each correspond to the additional preview.

5. The method of claim 1, wherein selecting the set of previews to display includes selecting previews that correspond to display capabilities of the predetermined set of electronic devices.

6. The method of claim 1, wherein selecting a set of previews to display includes applying analytics to detect display capabilities of the predetermined set of electronic devices.

7. The method of claim 1, wherein the instructions include at least one instruction selected from the group consisting of cropping, resizing, and replacing, relative to the particular image rendition.

8. The method of claim 1, wherein the instructions specify that another image replaces the image corresponding to the particular image rendition.

* * * * *